US009826482B2

(12) United States Patent
Park et al.

(10) Patent No.: US 9,826,482 B2
(45) Date of Patent: Nov. 21, 2017

(54) METHOD OF FINE GRAINED WAKE-UP MODES FOR WI-FI/BT UTILIZING WAKE-UP RECEIVER

(71) Applicant: INTEL CORPORATION, Santa Clara, CA (US)

(72) Inventors: Minyoung Park, Portland, OR (US); Alexander W. Min, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 59 days.

(21) Appl. No.: 14/752,184

(22) Filed: Jun. 26, 2015

(65) Prior Publication Data

US 2016/0381636 A1    Dec. 29, 2016

(51) Int. Cl.

| | | |
|---|---|---|
| *H04W 52/02* | (2009.01) | |
| *H04W 4/00* | (2009.01) | |
| *H04W 74/06* | (2009.01) | |
| *H04L 5/00* | (2006.01) | |
| *H04L 27/00* | (2006.01) | |
| *H04W 88/06* | (2009.01) | |
| *H04W 84/12* | (2009.01) | |

(52) U.S. Cl.
CPC ....... *H04W 52/0229* (2013.01); *H04L 5/0044* (2013.01); *H04L 27/0002* (2013.01); *H04W 4/008* (2013.01); *H04W 84/12* (2013.01); *H04W 88/06* (2013.01); *Y02B 60/50* (2013.01)

(58) Field of Classification Search
CPC . H04W 52/0229; H04W 4/008; H04W 74/06; H04L 5/0044; H04L 27/0002

USPC .......................................................... 370/311
See application file for complete search history.

(56) References Cited

U.S. PATENT DOCUMENTS

| | | | |
|---|---|---|---|
| 7,430,673 | B2 | 9/2008 | Kardach et al. |
| 8,156,353 | B2 | 4/2012 | Tsai |
| 8,175,109 | B2 | 5/2012 | Nogueira-Nine et al. |
| 8,286,014 | B2 | 10/2012 | Han et al. |
| 8,553,576 | B2 | 10/2013 | Park |
| 8,990,591 | B2 | 3/2015 | Zou et al. |

(Continued)

OTHER PUBLICATIONS

Office Action for U.S. Appl. No. 14/279,820, dated Sep. 15, 2015.
(Continued)

*Primary Examiner* — Ronald B Abelson
(74) *Attorney, Agent, or Firm* — Jason H. Vick; Sheridan Ross, PC

(57) ABSTRACT

Mobile platform power management is an important problem especially for battery-powered small form factor platforms such as smartphones, tablets, wearable devices, Internet of Things (IOT) devices, and the like. One exemplary technique disclosed herein defines a method for a fine-grained wake-up mode for Wi-Fi/BT/BLE that utilizes a low-power wake-up radio. For example, the actual data contained in the wake-up packet can be forwarded directly to a memory block of the device without waking-up the Wi-Fi/BT/BLE radio. As another example, if an IEEE 802.11 MAC frame is contained in the wake-up packet, then just the MAC processor of the Wi-Fi/BT/BLE radio can be woken up to process the IEEE 802.11 MAC frame contained in the wake-up packet, and have the PHY module of the Wi-Fi/BT/BLE radio kept powered off or in a low power mode to, for example, save energy.

25 Claims, 7 Drawing Sheets

(56) References Cited

U.S. PATENT DOCUMENTS

| | | |
|---|---|---|
| 9,568,972 B2 | 2/2017 | Yarvis et al. |
| 2004/0190467 A1 | 9/2004 | Liu et al. |
| 2005/0059347 A1 | 3/2005 | Haartsen |
| 2008/0044014 A1* | 2/2008 | Corndorf ............... H04L 63/12 380/37 |
| 2008/0108318 A1* | 5/2008 | Min .................. H04W 52/0229 455/343.1 |
| 2008/0162969 A1 | 7/2008 | Royannez et al. |
| 2008/0247376 A1 | 10/2008 | Del Prado Pavon et al. |
| 2010/0165896 A1 | 7/2010 | Gong et al. |
| 2010/0314452 A1 | 12/2010 | Yeo et al. |
| 2011/0103280 A1 | 5/2011 | Liu et al. |
| 2011/0243267 A1 | 10/2011 | Won et al. |
| 2011/0255454 A1 | 10/2011 | Hauser et al. |
| 2012/0147800 A1 | 6/2012 | Park et al. |
| 2012/0171954 A1 | 7/2012 | Rudland et al. |
| 2012/0250596 A1 | 10/2012 | Park |
| 2013/0007476 A1 | 1/2013 | Lake et al. |
| 2013/0058267 A1* | 3/2013 | Aldaz ............... H04L 12/40013 370/311 |
| 2013/0083722 A1 | 4/2013 | Bhargava |
| 2013/0145191 A1 | 6/2013 | Hung et al. |
| 2013/0252657 A1 | 9/2013 | Kafle |
| 2013/0254571 A1 | 9/2013 | Tian |
| 2014/0050133 A1 | 2/2014 | Jafarian et al. |
| 2014/0086124 A1 | 3/2014 | Knowles |
| 2014/0098724 A1 | 4/2014 | Park et al. |
| 2014/0105186 A1 | 4/2014 | Park et al. |
| 2014/0112224 A1 | 4/2014 | Jafarian et al. |
| 2014/0112229 A1 | 4/2014 | Merlin et al. |
| 2014/0112246 A1 | 4/2014 | Park et al. |
| 2014/0153507 A1 | 6/2014 | Yang et al. |
| 2014/0161118 A1 | 6/2014 | Lyer et al. |
| 2014/0185501 A1 | 7/2014 | Park et al. |
| 2014/0185502 A1 | 7/2014 | Kenney et al. |
| 2014/0211678 A1 | 7/2014 | Jafarian et al. |
| 2014/0223212 A1 | 8/2014 | Wu et al. |
| 2014/0269462 A1 | 9/2014 | Jia et al. |
| 2014/0269543 A1* | 9/2014 | Li ..................... H04W 28/18 370/329 |
| 2014/0269994 A1 | 9/2014 | HomChaudhuri et al. |
| 2014/0302849 A1 | 10/2014 | Palin et al. |
| 2015/0139051 A1 | 5/2015 | Gonia |
| 2015/0208349 A1* | 7/2015 | Ramamurthy .... H04W 52/0212 370/311 |

OTHER PUBLICATIONS

U.S. Appl. No. 14/279,820, filed May 16, 2014, Park.
U.S. Appl. No. 14/752,270, filed Jun. 26, 2015, Min et al.
Office Action for U.S. Appl. No. 14/279,820, dated Apr. 8, 2016.
U.S. Appl. No. 14/998,242, filed Dec. 26, 2015, Azizi et al.
U.S. Appl. No. 14/864,917, filed Sep. 25, 2015, Min et al.
International Search Report for International Application No. PCT/US2016/026190, dated Aug. 2, 2016.
Written Opinion for International Application No. PCT/US2016/026190, dated Aug. 2, 2016.
Notice of Allowance for U.S. Appl. No. 14/279,820, dated Oct. 24, 2016.
Notice of Allowance for U.S. Appl. No. 14/752,270, dated May 3, 2017.
U.S. Appl. No. 15/413,726, filed Jan. 24, 2017, Park.
Office Action for U.S. Appl. No. 14/752,270, dated Dec. 22, 2016.

* cited by examiner

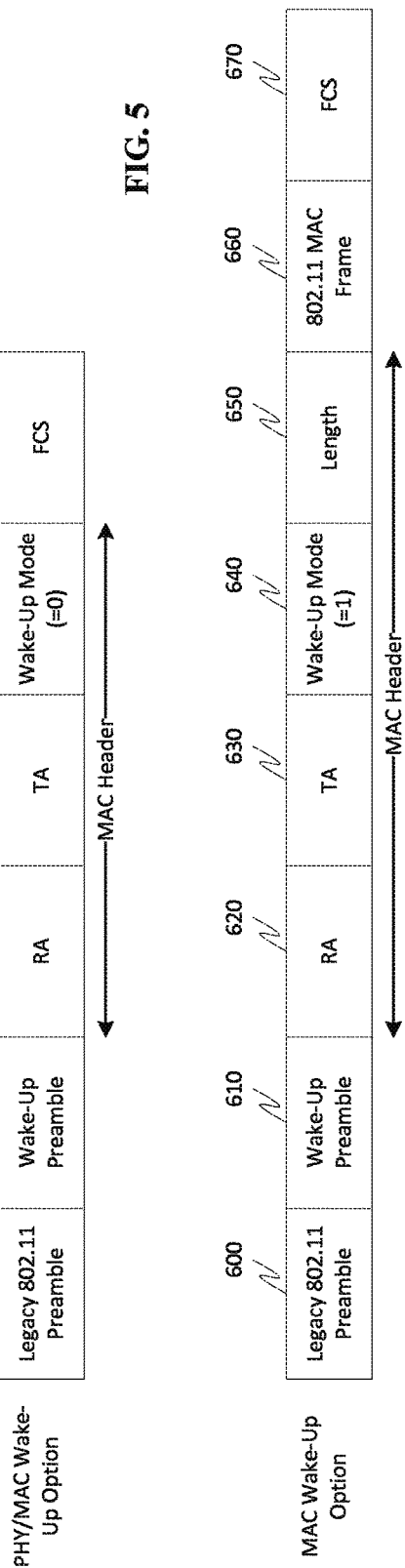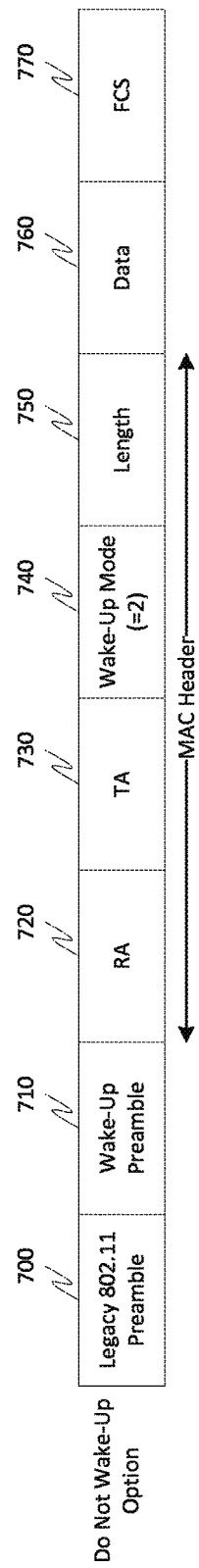

METHOD OF FINE GRAINED WAKE-UP MODES FOR WI-FI/BT UTILIZING WAKE-UP RECEIVER

TECHNICAL FIELD

An exemplary aspect is directed toward communications systems. More specifically an exemplary aspect is directed toward wireless communications systems and even more specifically to power management in wireless communications systems.

BACKGROUND

Wireless networks are ubiquitous and are commonplace indoors and becoming more frequently installed outdoors. Wireless networks transmit and receive information utilizing varying techniques. For example, but not by way of limitation, two common and widely adopted techniques used for communication are those that adhere to the Institute for Electronic and Electrical Engineers (IEEE) 802.11 standards such as the IEEE 802.11n standard and the IEEE 802.11ac standard.

The IEEE 802.11 standards specify a common Medium Access Control (MAC) Layer which provides a variety of functions that support the operation of IEEE 802.11-based wireless LANs (WLANs). The MAC Layer manages and maintains communications between IEEE 802.11 stations (such as between radio network cards (NIC) in a PC or other wireless device(s) or stations (STA) and access points (APs)) by coordinating access to a shared radio channel and utilizing protocols that enhance communications over a wireless medium.

IEEE 802.11ax is the successor to 802.11ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an exemplary packet structure;

FIG. 6 illustrates another exemplary packet structure;

FIG. 7 illustrates yet another exemplary packet structure;

DESCRIPTION OF EMBODIMENTS

Small computing devices such as wearable devices and sensors, mobile devices, and the like, are constrained by their small battery capacity but still need to support wireless communication technologies such as Wi-Fi, Bluetooth®, Bluetooth® Low Energy (BLE), or the like, to connect to other computing devices, such as smart phones, tablets, computers, and the like, and exchange data. These communications consume power and it is critical to minimize energy consumption of such communications in these devices.

One ideal strategy to minimize energy consumption is to turn the power off to the communication block as much/often as possible while maintaining data transmission and reception without increasing latency by too much. That is, power on the communications block only when there is data to transmit and wake-up the communications block just before data reception, and power off the communications block for the rest of the time.

Figure 1:
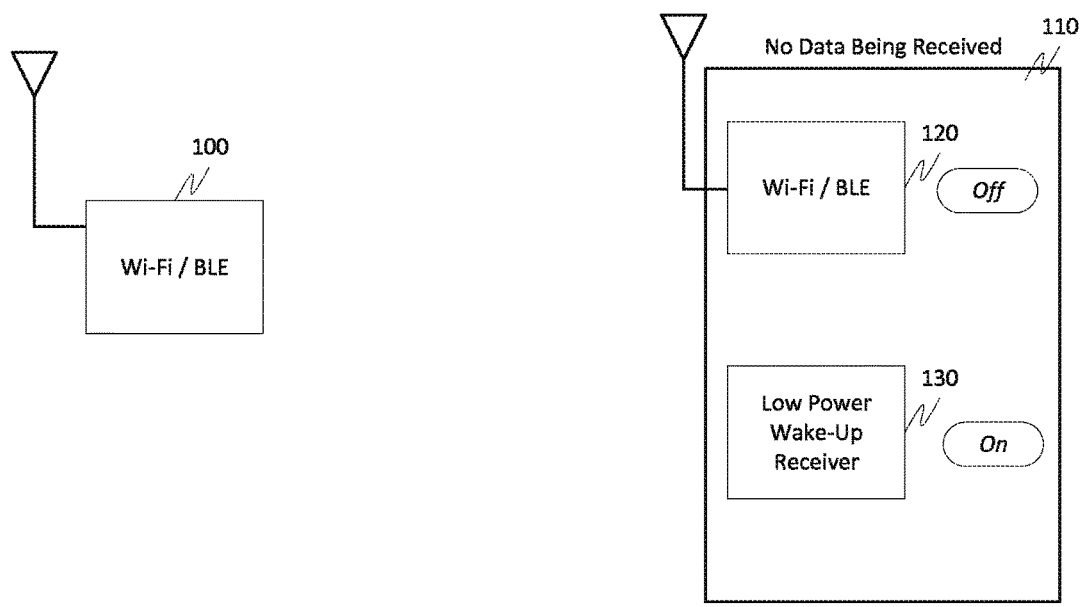
FIG. 1 illustrates a Low-Power Wake-Up Radio (LP-WUR) in a no data being received environment.
Figure 2:
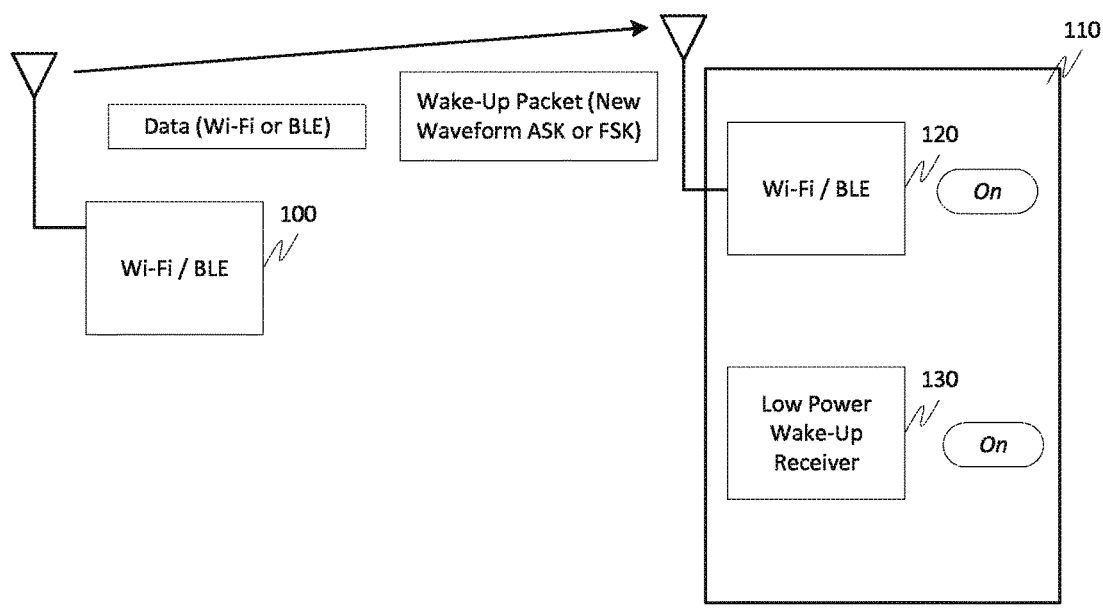
FIG. 2 illustrates a Low-Power Wake-Up Radio (LP-WUR) that is receiving data.

As illustrated in FIGS. 1 and 2, one way to realize the ideal transmit/receive strategy is to add a low-power wake-up receiver (LP-WUR) that can wake-up the main radio such as a Wi-Fi, Bluetooth® radio, BLE radio, only when there is data to receive/transmit. (See FIG. 1 where the Wi-Fi/BT/BLE 120 is off and the low power wake-up receiver 130 is on with no data being received). Some research shows the power consumption of such low-power wake-up radios (LP-WUR) can be less than 100 microwatts.

However, in FIG. 2, when a wake-up packet is received the LP-WUR 130 wakes-up the whole Wi-Fi/BT/BLE radio 120, so that a data packet that follows the wake-up packet can be received correctly. In some cases however, the actual data or an IEEE 802.11 MAC frame can be included in a wake-up packet. In this case, there is no need to wake-up the whole Wi-Fi/BT/BLE radio but just a part of the Wi-Fi/BT/BLE radio needs to be woken up to do the necessary processing. This can lead to a significant power saving.

One exemplary technique disclosed herein defines a method for a fine-grained wake-up mode for Wi-Fi/BT/BLE that utilizes a low-power wake-up radio. For example, the actual data contained in the wake-up packet can be forwarded directly to a memory block of the device without waking-up the Wi-Fi/BT/BLE radio.

As another example, if an IEEE 802.11 MAC frame was contained in the wake-up packet, then just the MAC processor of the Wi-Fi/BT/BLE radio needs to be woken up to process the IEEE 802.11 MAC frame contained in the wake-up packet, and have the PHY module of the Wi-Fi/BT/BLE radio kept powered off or in a low power mode.

In accordance with an exemplary embodiment, many fine-grained wake-up modes are defined for a Wi-Fi/BT/BLE radio that utilizes a LP-WUR so that when a wake-up packet is received, not the entirety of the Wi-Fi/BT/BLE radio needs to be powered up, but only the necessary parts (or components) of the Wi-Fi/BT/BLE radio are selectively woken-up to save energy, reduce latency, and the like.

Many solutions that use an LP-WUR wake-up the whole Wi-Fi/BT/BLE radio when a wake-up packet is received. One exemplary aspect discussed herein only wakes-up the necessary parts of the Wi-Fi/BT/BLE radio required to process the received data, hence saving significant amounts of energy and avoiding unnecessary latency in waking-up the main radio.

Figure 3:
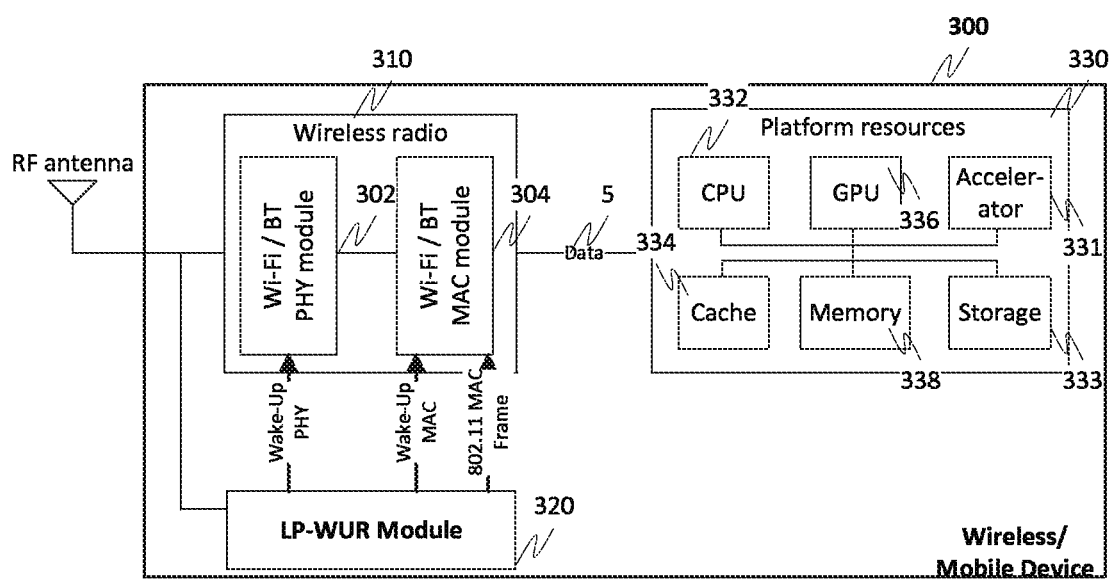
FIG. 3 illustrates a functional block diagram of a wireless device, such as a mobile device.

FIG. 3 illustrates an exemplary functional block diagram of a wireless device 300, such as a mobile device, that can be used with any one or more of the aspects disclosed herein. In particular, this exemplary architecture allows the LP-WUR module 320 to control power signalling operations for the device 300 and optionally various platform resources 330.

More specifically, FIG. 3 illustrates an exemplary wireless/mobile device 300 that includes a wireless radio 310, which includes a Wi-Fi/Bluetooth® (BT)/BLE PHY module 302, a Wi-Fi/BT/BLE MAC module 304, an LP-WUR module 320, and one or more platform resources 330, such as CPU 332, cache 334, GPU 336, memory 338, accelerator 331 and storage 333. The wireless/mobile device 300 as illustrated in FIG. 3 includes arrows illustrating the wake-up/data signals/information between the elements. Specifically, the LP-WUR module 320 can send a wake-up signal(s) to the Wi-Fi/BT/BLE PHY module 302 and the Wi-Fi/BT/BLE MAC module 304.

Figure 4:
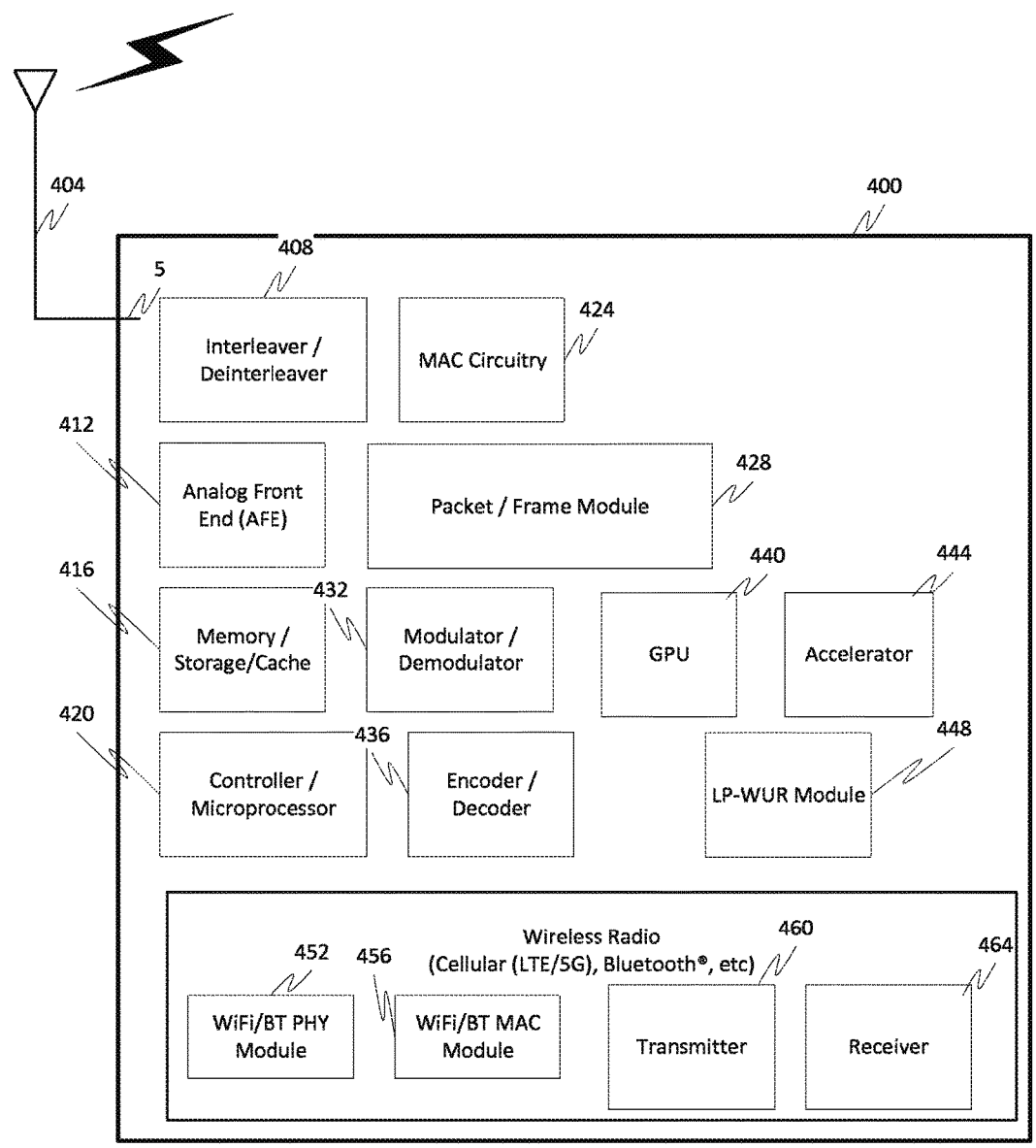
FIG. 4 illustrates a hardware block diagram of an exemplary wireless device such as a mobile device.

FIG. 4 illustrates an exemplary hardware diagram of a device 400, such as a wireless device, mobile device, access point, or the like, that is adapted to implement the technique(s) discussed herein.

In addition to well-known componentry (which has been omitted for clarity), the device 400 includes one or more antennas 404, an interleaver/deinterleaver 408, an analog front end (AFE) 412, memory/storage 416, controller/microprocessor 420, transmitter 460, modulator/demodulator 432, encoder/decoder 436, MAC Circuitry 424, receiver 464, and optionally one or more radios such as a cellular radio/Bluetooth®/Bluetooth® low energy radios. The various elements in the device 400 are connected by one or more links (not shown, again for sake of clarity).

The device 400 can have one more antennas 404, for use in wireless communications such as multi-input multi-output (MIMO) communications, Bluetooth®, etc. The antennas 404 can include, but are not limited to directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 404 generally interact with an Analog Front End (AFE) 412, which is needed to enable the correct processing of the received modulated signal. The AFE 412 can be located between the antenna and a digital baseband system in order to convert the analog signal into a digital signal for processing.

The device 400 can also include a controller/microprocessor 420 and a memory/storage 416. The device 400 can interact with the memory/storage 416 which may store information and operations necessary for configuring and transmitting or receiving the information described herein. The memory/storage 416 may also be used in connection with the execution of application programming or instructions by the controller/microprocessor 420, and for temporary or long term storage of program instructions and/or data. As examples, the memory/storage 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the device 400. Furthermore, the controller/microprocessor 420 can perform operations for configuring and transmitting information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The device 400 can further include a transmitter 460 and receiver 464 which can transmit and receive signals, respectively, to and from other wireless devices or access points using the one or more antennas 404. Included in the device 400 circuitry is the medium access control or MAC Circuitry 424. MAC circuitry 424 provides for controlling access to the wireless medium. In an exemplary embodiment, the MAC circuitry 424 may be arranged to contend for the wireless medium and configure frames or packets for communicating over the wireless medium.

The device 400 can also optionally contain a security module (not shown). This security module can contain information regarding but not limited to, security parameters required to connect the device to an access point or other device or other available network(s), and can include WEP or WPA security access keys, network keys, etc. The WEP security access key is a security password used by Wi-Fi networks. Knowledge of this code will enable a wireless device to exchange information with the access point. The information exchange can occur through encoded messages with the WEP access code often being chosen by the network administrator. WPA is an added security standard that is also used in conjunction with network connectivity with stronger encryption than WEP.

As shown in FIG. 4, the device 400 also includes a GPU 440, an accelerator 444 a packet/frame module 428 a LP-WUR module 448 a Wi-Fi/BT/BLE PHY module 452 and a Wi-Fi/BT/BLE MAC module 456 that at least cooperate with the LP-WUR module 448 and the packet/frame module 428 to achieve at least the more efficient operation a discussed herein.

In operation, and in exemplary embodiments, techniques are disclosed which are generally directed toward a new wake-up mode field in a wake-up packet as shown in FIGS. 5-8, and the use of this packet to control at least receiver functionality.

More specifically, and in general, the packet can include one or more of: a legacy IEEE 802.11 preamble field which can contain the IEEE 802.11 legacy preamble; a wake-up preamble field can contain the wake-up packet preamble; an RA field can be the receiver address and the TA field can be the transmitter address; an optional length field can indicate the length of the IEEE 802.11 MAC frame field or the data field; and the FCS field can indicate the Frame Check Sequence field as shown in the figures.

Figure 8:
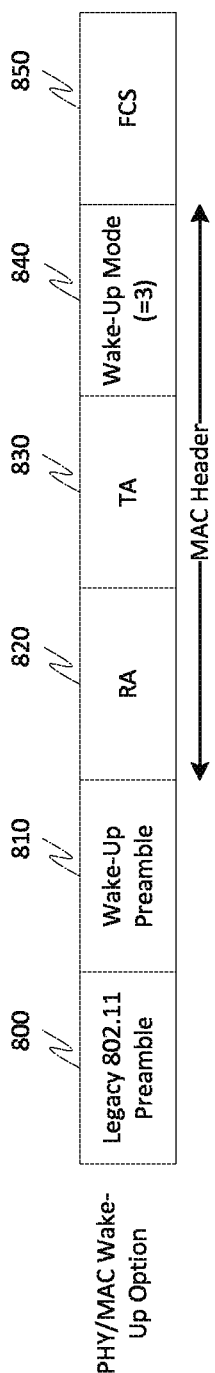
FIG. 8 illustrates a further exemplary packet structure.

More specifically, FIGS. 5-8 illustrate four exemplary wake-up packets or frames, with FIG. 5 illustrating an exemplary PHY/MAC wake-up option packet, FIG. 6 illustrating an exemplary MAC wake-up option packet, FIG. 7 illustrating an exemplary do not wake-up option packet, and FIG. 8 illustrating a second exemplary PHY/MAC wake-up option packet. As will be appreciated, the various fields shown within the packets in FIGS. 5-8 can be optional, reordered, for example, based on implementation, of different or varying lengths, and the length field can optionally be used to indicate a length of the following data field or frame. Additionally, the field value can be of any value that corresponds to an associated operation/description of the wake-up protocol.

In general, the wake-up mode field values in the packet/frame can be:

TABLE

Wake-up Field Information

| Wake-up mode field value in the frame/packet | Description/Operation |
| --- | --- |
| 0 | PHY/MAC wake-up option 1 |
| 1 | MAC wake-up option |
| 2 | Do not wake-up option |
| 3 | PHY/MAC wake-up option 2 |

FIG. 5 illustrates an exemplary packet format for the PHY/MAC wake-up option 1, where, for example, the wake-up mode field=0. The packet includes, for example, a legacy IEEE 802.11 preamble 500, a wake-up preamble 510, an RA field 520, a TA field 530, a wake-up mode field 540, and an FCS field 550.

In use, if there is a data packet to transmit following the wake-up packet, the transmitter sets the wake-up mode field in the wake-up packet to correspond to PHY/MAC wake-up option 1 (wake-up mode field=0), as shown in FIG. 5. Upon receiving the wake-up packet with the wake-up mode field set to correspond to PHY/MAC wake-up option 1, the LP-WUR radio 448 wakes up the whole Wi-Fi/BT/BLE radio so that the radio can receive a data packet following the wake-up packet as shown in FIG. 2. The transmitter can then transmit a data packet following the wake-up packet.

FIG. 8 illustrates an exemplary packet for indicating PHY/MAC wake-up option 2. In this exemplary mode, the wake-up mode field=3 as shown field 840. In FIG. 8, the fields are similar to those in FIG. 5, with the legacy IEEE 802.11 preamble being in field 800, a wake-up preamble 810, an RA 820, a TA 830, and an FCS 850. If there is a data packet to transmit, the transmitter can set the wake-up mode field in the wake-up packet in FIGS. 8 to 3 as shown in the figure. This indicates that the receiver transmits a PS-Poll frame or a trigger frame (a data frame) following the channel access rules defined in the IEEE 802.11 standard after reception of the wake-up packet. Upon receiving the wake-up packet as shown in FIG. 8, with the wake-up mode field 840 set to 3, the LP-WUR 448 radio wakes-up the whole Wi-Fi radio and signals to the Wi-Fi radio that PHY/MAC wake-up option 2 has been requested by the transmitter.

Following the rules for the channel access defined in IEEE 802.11 standards, the Wi-Fi radio of the receiver then transmits a PS-Poll or a trigger frame (e.g., a data frame or a null data frame) to the transmitter indicating that the receiver is in the active state and ready to receive a data frame. The transmitter follows the rules defined in the standard to deliver the buffer data to the receiver.

FIG. 6 illustrates an exemplary packet format for a MAC wake-up option, where the wake-up mode field=1. In particular, the exemplary packet format in FIG. 6 includes a legacy IEEE 802.11 preamble 600, a wake-up preamble 610, an RA field 620, a TA field 630, a wake-up mode field 640, a length filed 650, a IEEE 802.11 MAC frame 660, and an FCS field 670. Here, if the transmitter needs to include an IEEE 802.11 MAC frame inside the wake-up packet, the transmitter can set the wake-up mode field in the wake-up packet to the MAC wake-up option (e.g., wake-up mode field=1) and have the IEEE 802.11 MAC frame 660 included in the wake-up packet as shown in FIG. 6. Upon receiving the wake-up packet with the wake-up mode field set to correspond to the MAC wake-up option, the LP-WUR radio 448 wakes-up only the MAC module 456 of the Wi-Fi/BT/BLE radio and then forwards the IEEE 802.11 MAC frame field 660 of the wake-up packet to the MAC module 456. The MAC module 456 then processes the payload received from the LP-WUR radio 448. Similarly, a BT/BLE PDU can be included in the wake-up packet as an additional MAC wake-up option for the BT/BLE PDU.

FIG. 7 illustrates an exemplary packet format for a do not wake-up mode, where the wake-up mode field=2. In particular, the packet format in FIG. 7 includes a legacy IEEE 802.11 preamble 700, a wake-up preamble 710, an RA field 720, a TA field 730, a wake-up mode field 740, a length field 750, a data field 760, and an FCS field 770.

If the transmitter needs to send actual data that will be used by an application running on the receiving device, the transmitter sets the wake-up mode field to correspond to the "o not wake-up option (i.e., wake-up mode field=2), and includes actual data 760 in the wake-up frame. Upon receiving the wake-up packet with the wake-up mode field set to the do not wake-up option, the LP-WUR module 448 instructs the radio to not wake-up the Wi-Fi/BT/BLE radio, but forwards the payload of the wake-up packet to, for example, a specified memory block of the device.

One exemplary benefit of these techniques is that it further reduces energy consumption of a wireless devices that uses an LP-WUR together with a Wi-Fi/BT/BLE radio.

Figure 9:
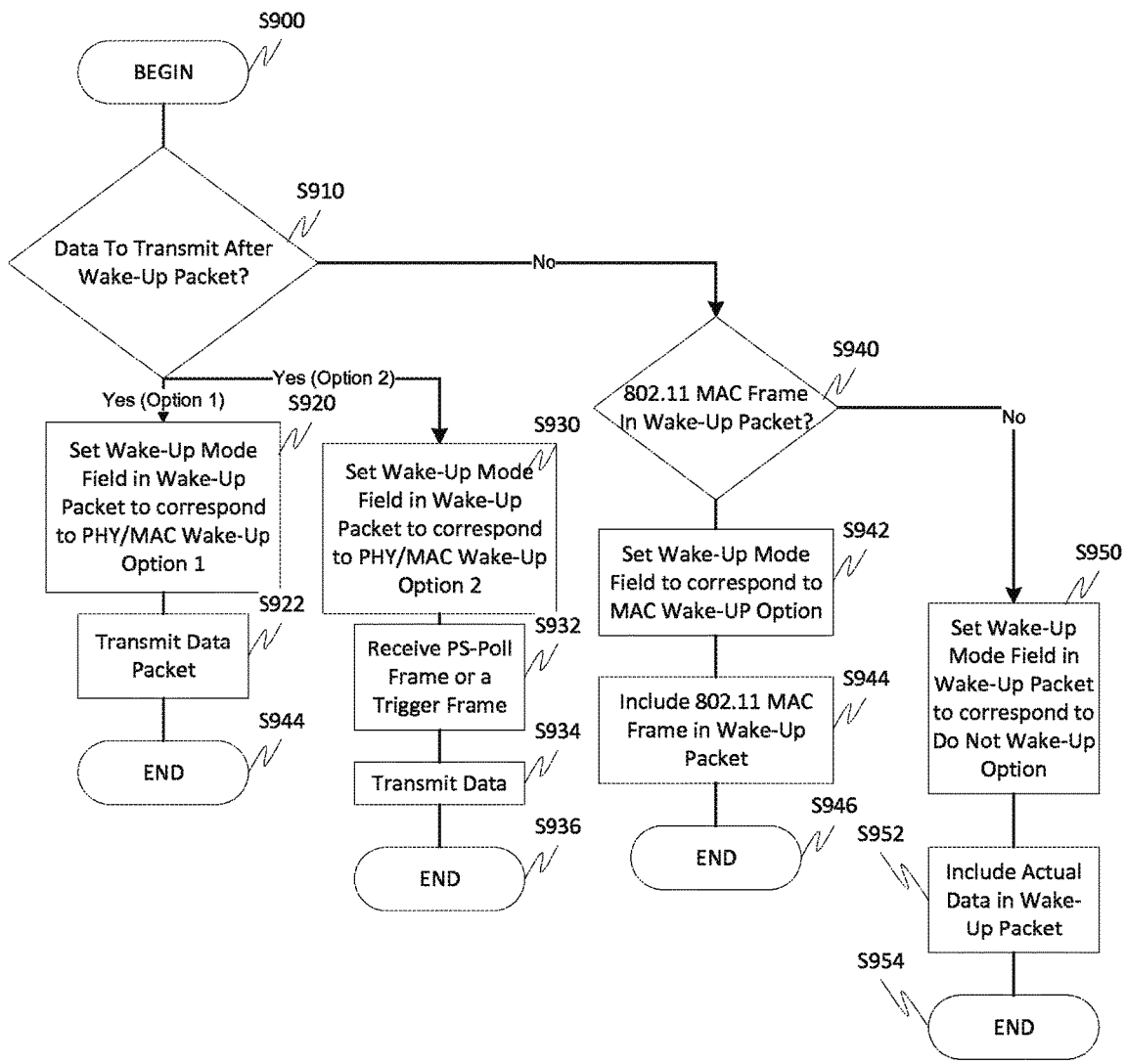
FIG. 9 is a flowchart illustrating an exemplary method for a wake-up mode.

FIG. 9 is a flowchart outlining an exemplary operation of a transmitter. In particular, control begins in step S900 and continues to step S910. In step S910, a determination is made as to whether there is data to transmit after the wake-up packet. If there is data to transmit after the wake-up packet, control continues to step S920 (Option 1) or S930 (Option 2), with control otherwise jumping to step S940.

In step S920, and as the first option, the transmitter can set the wake-up mode field in the wake-up packet to correspond to PHY/MAC wake-up option 1 (e.g., wake-up mode field=0). Next, in step S922, the transmitter transmits one or more data packets with control continuing to step S944 where the control sequence ends.

A second option in step S930 is that the transmitter sets the wake-up field in the wake-up packet to correspond to PHY/MAC wake-up option 2 (e.g., wake-up mode field=3). Next, in step S932, the transmitter receives a PS-Poll frame or a trigger frame from the receiver. Then, in step S934, the transmitter transmits data with control continuing to step S936 where the control sequence ends.

In step S940, a determination is made as to whether an IEEE 802.11 MAC frame is in the wake-up packet. If there is an IEEE 802.11 MAC frame in the wake-up packet, control continues to step S942 with control otherwise jumping to step S950.

In step S942, the transmitter sets the wake-up mode field to correspond to the MAC wake-up option (e.g., wake-up mode field=1). Next, in step S944, an IEEE 802.11 MAC frame is included by the transmitter in the wake-up packet which is communicated to the receiver, with control continuing to step S946 where the control sequence ends.

In step S950, the transmitter sets the wake-up mode field to correspond to the do not wake-up option (wake-up mode field=2). Next, in step S952, actual data is included in the wake-up packet which is transmitted to the receiver, with control continuing to step S954 where the control sequence ends.

Figure 10:
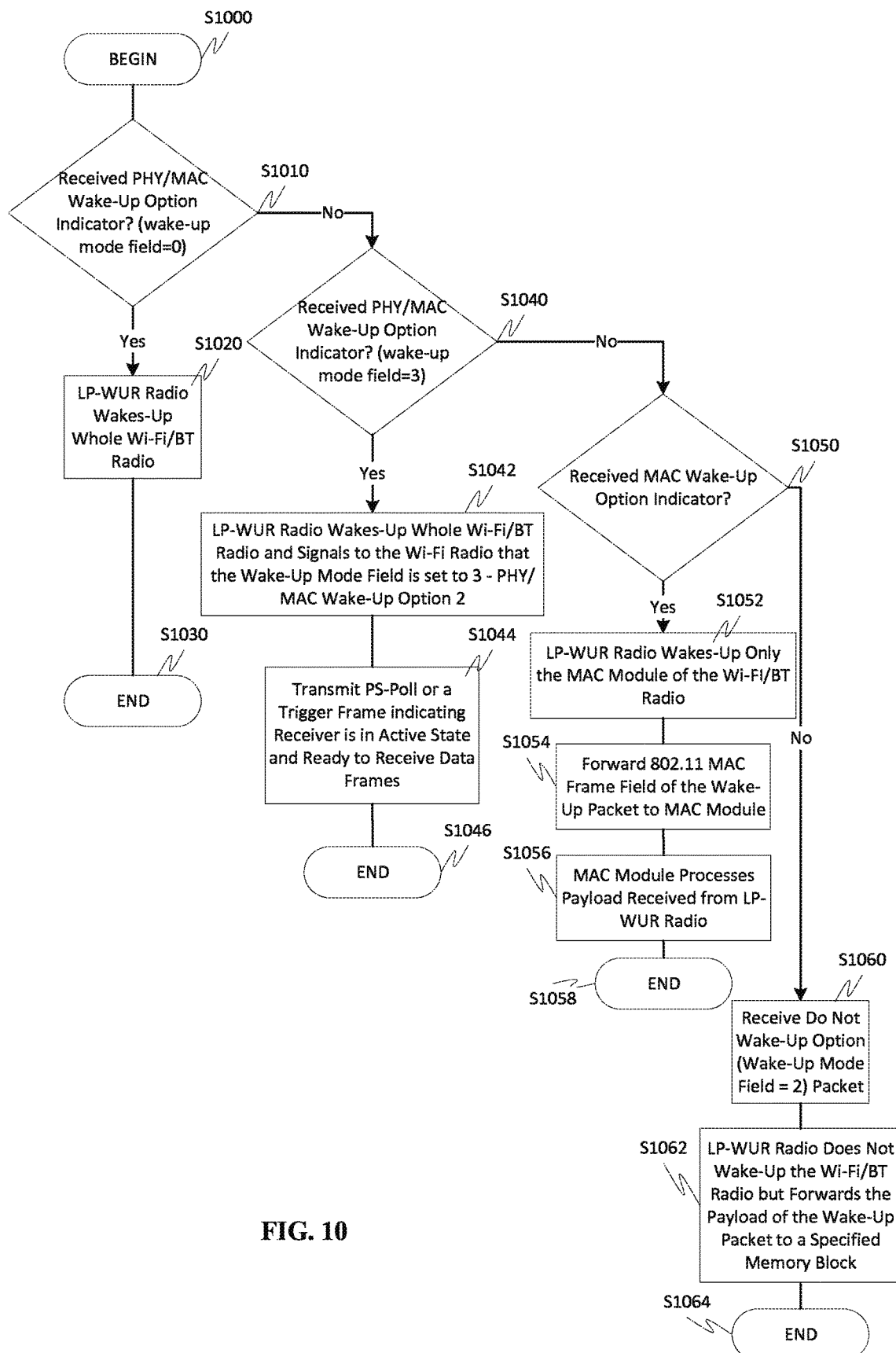
FIG. 10 is a flowchart illustrating another exemplary method for a wake-up mode.

FIG. 10 is a flowchart outlining an exemplary method of receiver operation. In particular, control begins in step S1000 and continues to step S1010. In step S1010, a determination is made as to whether the receiver has received a PHY/MAC wake-up option 1 indicator (wake-up mode field=0). If a PHY/MAC wake-up option 1 indicator is received, control continues to step S1020 with control otherwise continuing to step S1040. In step S1020, the LP-WUR radio wakes-up the whole Wi-Fi/BT/BLE radio. Control then continues to step S1030 where the control sequence ends.

In step S1040, a determination is made as to whether a PHY/MAC wake-up option 2 indicator (wake-up mode field=3) has been received. If the PHY/MAC wake-up option 2 indicator has been received, control continues to step S1042 with control otherwise jumping to step S1050.

In step S1042, the LP-WUR radio wakes-up the whole Wi-Fi/BT/BLE radio and signals to the Wi-Fi/BT/BLE radio that the PHY/MAC wake-up option 2 has been requested. Next, in step S1044, the receiver returns to the transmitter, a PS-Poll and/or a trigger frame indicating the receiver is in an active state and ready to receive data frames. Control then continues to step S1046 where the control sequence ends.

In step S1050, a determination is made as to whether a MAC wake-up option indicator has been received (wake-up mode field=1). If a MAC wake-up option indicator has been received, control continues to step S1052 with control otherwise jumping to step S1060.

In step S1052, the LP-WUR radio wakes-up only the MAC module of the Wi-Fi/BT/BLE radio. Next, in step S1054, the IEEE 802.11 MAC frame field of the wake-up packet is forwarded to the MAC module. Then, in step S1056, the MAC module processes the payload received from the LP-WUR radio with control continuing to step S1058 where the control sequence ends.

In step S1060, the receiver has received a do not wake-up option packet where the wake-up mode field is set to 2. Next, in step S1062, the LP-WUR radio does not wake-up the Wi-Fi/BT/BLE radio, but instead forwards the payload of the wake-up packet to, for example, a specified memory block. Control then continues to step S1064 where the control sequence ends.

It should be appreciated, the various power management schemes discussed herein can have their specific features interchanged with one or more of the other power management schemes to provide, for example, further power savings, to alter/improve latency and/or alter platform functionality. While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used in other flowcharts illustrated herein.

It is to also be understood that when it is discussed that the whole Wi-Fi/BT/BLE radio is to be turned on/off, it can be one or more of the Wi-Fi, Bluetooth®, and Bluetooth® Low Energy radio(s) that are turned on/off and if the device has all three radios, they need not all be turned on/off but optionally only the radio(s) that is needed.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to power control in a wireless transceiver. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless communications device comprising:
a low-power wake-up radio configured to receive a packet indicating a wake-up option and selectively waking-up one or more of a PHY module and a MAC module based on a wake-up mode field in the packet.

Any one or more of the above aspects, further comprising one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

Any one or more of the above aspects, wherein the destination is a memory address.

Any one or more of the above aspects, wherein the packet includes one or more of a legacy IEEE 802.11 preamble, a wake-up preamble, a receiver address, a transmitter address, a length field, an 802.11 MAC frame and a FCS field.

Any one or more of the above aspects, wherein the wake-up mode field is read by a low power wake-up radio module.

Any one or more of the above aspects, wherein the wireless communications device is configured to transmit a trigger frame or a PS-Poll to indicate a receiver is ready to receive data frames.

Any one or more of the above aspects, wherein the wireless communications device is configured to determine if there is data to transmit after the packet or if there is a MAC frame in the wake-up packet.

Any one or more of the above aspects, wherein actual data is included in the wake-up packet.

Any one or more of the above aspects, configured to one or more of save power and improve latency at least based on the received wake-up mode field.

A wireless communications method comprising:
receiving a wake-up packet and selectively wake-up one or more of a PHY module and a MAC module based on a wake-up mode field in the packet.

Any one or more of the above aspects, further comprising one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

Any one or more of the above aspects, wherein the destination is a memory address.

Any one or more of the above aspects, wherein the packet includes one or more of a legacy IEEE 802.11 preamble, a wake-up preamble, a receiver address, a transmitter address, a length field, an 802.11 MAC frame and a FCS field.

Any one or more of the above aspects, wherein the wake-up mode field is read by a low power wake-up radio module.

Any one or more of the above aspects, wherein the wireless communications device is configured to transmit a trigger frame or a PS-Poll to indicate a receiver is ready to receive data frames.

Any one or more of the above aspects, wherein the wireless communications device is configured to determine if there is data to transmit after the packet or if there is a MAC frame in the wake-up packet.

Any one or more of the above aspects, wherein actual data is included in the wake-up packet.

Any one or more of the above aspects, configured to one or more of save power and improve latency at least based on the received wake-up mode field.

A wireless communications device comprising:
means for receiving a wake-up packet; and
means for selectively wake-up one or more of a PHY module and a MAC module based on a wake-up mode field in the packet.

Any one or more of the above aspects, further comprising one or more of a transmitter, a receiver, an interleaver/deinterleaver, an analog front end, a modulator/demodulator, a GPU, an accelerator, an encoder/decoder, one or more antennas, a processor and memory.

Any one or more of the above aspects, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

Any one or more of the above aspects, wherein the packet includes one or more of a legacy IEEE 802.11 preamble, a wake-up preamble, a receiver address, a transmitter address, a length field, an 802.11 MAC frame and a FCS field.

A non-transitory computer-readable information storage media, having stored thereon instructions, that when executed by a processor perform the method of any one or more of the above aspects.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for power management in a wireless device. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a low-power wake-up radio, in communication with a main radio, configured to receive a packet indicating a wake-up option and selectively waking-up one of, each of or neither of a PHY module and a MAC module based on information in a wake-up mode field in the packet, wherein the received packet is intended for the wireless communications device.

2. The device of claim 1, further comprising one or more of a transmitter, a receiver, an interleaver/deinterleaver, an analog front end, a modulator/demodulator, a GPU, an accelerator, an encoder/decoder, one or more antennas, a processor and memory.

3. The device of claim 1, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

4. The device of claim 3, wherein the destination is a memory address.

5. The device of claim 1, wherein the packet includes one or more of a legacy IEEE 802.11 preamble, a wake-up preamble, a receiver address, a transmitter address, a length field, an 802.11 MAC frame and a FCS field.

6. The device of claim 5, wherein the wake-up mode field is read by a low power wake-up radio module.

7. The device of claim 6, wherein the wireless communications device is configured to transmit a trigger frame or a PS-Poll to indicate a receiver is ready to receive data frames.

8. The device of claim 1, wherein the wireless communications device is configured to determine if there is data to transmit after the packet or if there is a MAC frame in the wake-up packet.

9. The device of claim 1, wherein actual data is included in the wake-up packet.

10. The device of claim 1, configured to one or more of save power and improve latency at least based on the received wake-up mode field.

11. A wireless communications method comprising:
receiving a wake-up packet at a low-power wake-up radio in communication with a main radio, and selectively waking-up one of, each of or neither of a PHY module and a MAC module based on information in a wake-up mode field in the packet, wherein the received packet is intended for a wireless communications device.

12. The method of claim 11, further comprising one or more of a transmitter, a receiver, an interleaver/deinterleaver, an analog front end, a modulator/demodulator, a GPU, an accelerator, an encoder/decoder, one or more antennas, a processor and memory.

13. The method of claim 11, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

14. The method of claim 13, wherein the destination is a memory address.

15. The method of claim 11, wherein the packet includes one or more of a legacy IEEE 802.11 preamble, a wake-up preamble, a receiver address, a transmitter address, a length field, an 802.11 MAC frame and a FCS field.

16. The method of claim 15, wherein the wake-up mode field is read by a low power wake-up radio module.

17. The method of claim 16, wherein the wireless communications device is configured to transmit a trigger frame or a PS-Poll to indicate a receiver is ready to receive data frames.

18. The method of claim 11, wherein the wireless communications device is configured to determine if there is data to transmit after the packet or if there is a MAC frame in the wake-up packet.

19. The method of claim 11, wherein actual data is included in the wake-up packet.

20. The method of claim 11, configured to one or more of save power and improve latency at least based on the received wake-up mode field.

21. A non-transitory computer-readable information storage media, having stored thereon instructions, that when executed by a processor perform the method of claim 11.

22. A wireless communications device comprising:
a low-power wake-up radio that receives a wake-up packet; and
means for selectively waking-up one of, each of or neither of a PHY module and a MAC module of a main radio based on information in a wake-up mode field in the packet, wherein the received packet is intended for the wireless communications device.

23. The device of claim 22, further comprising one or more of a transmitter, a receiver, an interleaver/deinterleaver, an analog front end, a modulator/demodulator, a GPU, an accelerator, an encoder/decoder, one or more antennas, a processor and memory.

24. The device of claim 22, wherein the wake-up mode field indicates that the wireless communications device should: wake-up a PHY module, wake-up the PHY module and the MAC module, wake-up the PHY module and MAC module and transmit an acknowledgment packet or not wake-up a wireless radio and to forward a payload of the packet to a destination.

25. The device of claim 22, wherein the packet includes one or more of a legacy IEEE 802.11 preamble, a wake-up preamble, a receiver address, a transmitter address, a length field, an 802.11 MAC frame and a FCS field.

* * * * *